(12) United States Patent
Lombardo

(10) Patent No.: US 8,708,268 B2
(45) Date of Patent: Apr. 29, 2014

(54) FISHING REEL

(76) Inventor: William Joseph Lombardo, Highland Park, IL (US)

( * ) Notice: Subject to any disclaimer, the term of this patent is extended or adjusted under 35 U.S.C. 154(b) by 108 days.

(21) Appl. No.: 13/591,720

(22) Filed: Aug. 22, 2012

(65) Prior Publication Data

US 2013/0087648 A1 Apr. 11, 2013

Related U.S. Application Data

(60) Provisional application No. 61/627,294, filed on Oct. 11, 2011.

(51) Int. Cl.
*A01K 89/01* (2006.01)

(52) U.S. Cl.
USPC .............................. 242/229; 242/249; 242/322

(58) Field of Classification Search
CPC .............................. A01K 89/015; A01K 89/06
USPC .................................. 242/229, 249, 313, 322
See application file for complete search history.

(56) References Cited

U.S. PATENT DOCUMENTS

| | | | | |
|---|---|---|---|---|
| 1,617,543 A | * | 2/1927 | Roberts | 242/229 |
| 2,589,776 A | * | 3/1952 | Colgrove | 242/229 |
| 2,633,307 A | | 3/1953 | Morgan et al. | |
| 3,004,731 A | | 10/1961 | Mauborgne | |
| 3,350,029 A | * | 10/1967 | Isbell | 242/229 |
| 3,425,643 A | | 2/1969 | Lemon | |
| 3,727,857 A | | 4/1973 | Chann | |
| 3,817,470 A | * | 6/1974 | Calhoun | 242/229 |
| 3,903,635 A | | 9/1975 | Boese | |
| 3,944,159 A | * | 3/1976 | Dobbs | 242/229 |
| 4,019,693 A | | 4/1977 | Lesage | |
| 4,184,651 A | | 1/1980 | McConachy | |
| 4,213,579 A | | 7/1980 | Fox | |
| 4,411,395 A | | 10/1983 | Steffens | |
| 4,725,013 A | | 2/1988 | Epperson | |
| 4,927,095 A | | 5/1990 | Young | |
| 5,669,565 A | | 9/1997 | Zurcher et al. | |
| 5,799,889 A | | 9/1998 | Plestan | |
| 5,873,536 A | * | 2/1999 | Beldycki | 242/323 |

(Continued)

OTHER PUBLICATIONS

Abu Garcia, 170 Spin Casting Reel Schematics, accessed at http://www.abugarcia.com/product_schematic.php?id=226.229 on May 12, 2010, 2 pages.

(Continued)

*Primary Examiner* — Emmanuel M Marcelo
(74) *Attorney, Agent, or Firm* — McDonnell Boehnen Hulbert & Berghoff

(57) ABSTRACT

A fishing reel having a reel housing comprising a ring gear with a rod mount directly or indirectly attached to the ring gear and a spool positioned within the ring gear, a reel crank adapted to impart rotational movement to the spool, a line guide positioned radially outwardly from the spool, a flange hingedly attached to the spool, wherein the spool may be positioned in a first casting position wherein the axis of the spool is generally parallel to a fishing rod when the rod mount is mounted to the fishing rod; and wherein the spool is movable 90 degrees with respect to the flange to be positioned in a second reeling position, wherein the axis of the spool is generally perpendicular to a fishing line being retrieved upon line retrieval; and wherein as the reel crank is rotated the spool orbitally rotates within the ring gear.

22 Claims, 6 Drawing Sheets

(56) References Cited

U.S. PATENT DOCUMENTS

| | | | |
|---|---|---|---|
| 6,257,513 | B1 | 7/2001 | Cockerham et al. |
| 6,446,894 | B1 | 9/2002 | Holma et al. |
| 6,561,448 | B2 | 5/2003 | Barker |
| 7,478,774 | B2 * | 1/2009 | Chang et al. ................. 242/229 |
| 7,896,277 | B2 | 3/2011 | Lombardo et al. |
| 2009/0250540 | A1 | 10/2009 | Bennis |
| 2012/0001007 | A1 * | 1/2012 | Bloemendaal ................ 242/229 |

OTHER PUBLICATIONS

Abu Garcia, Ambassador 1000 Bait Casting Reel Schematics, accessed at http://www.abugarcia.com/product_schematic.php?id=226.228 on May 12, 2010, 3 pages.

OldReels.com, "Pivoting Spinning Reels," accessed at http://www.oldreels.com/pivoting_reels.htm on May 12, 2010, 6 pages.

Abu Garcia, 1000 Series Spinning Reel Schematics, accessed at http://www.abugarcia.com/product_schernatic.php?id=226.227 on May 12, 2010, 3 pages.

* cited by examiner

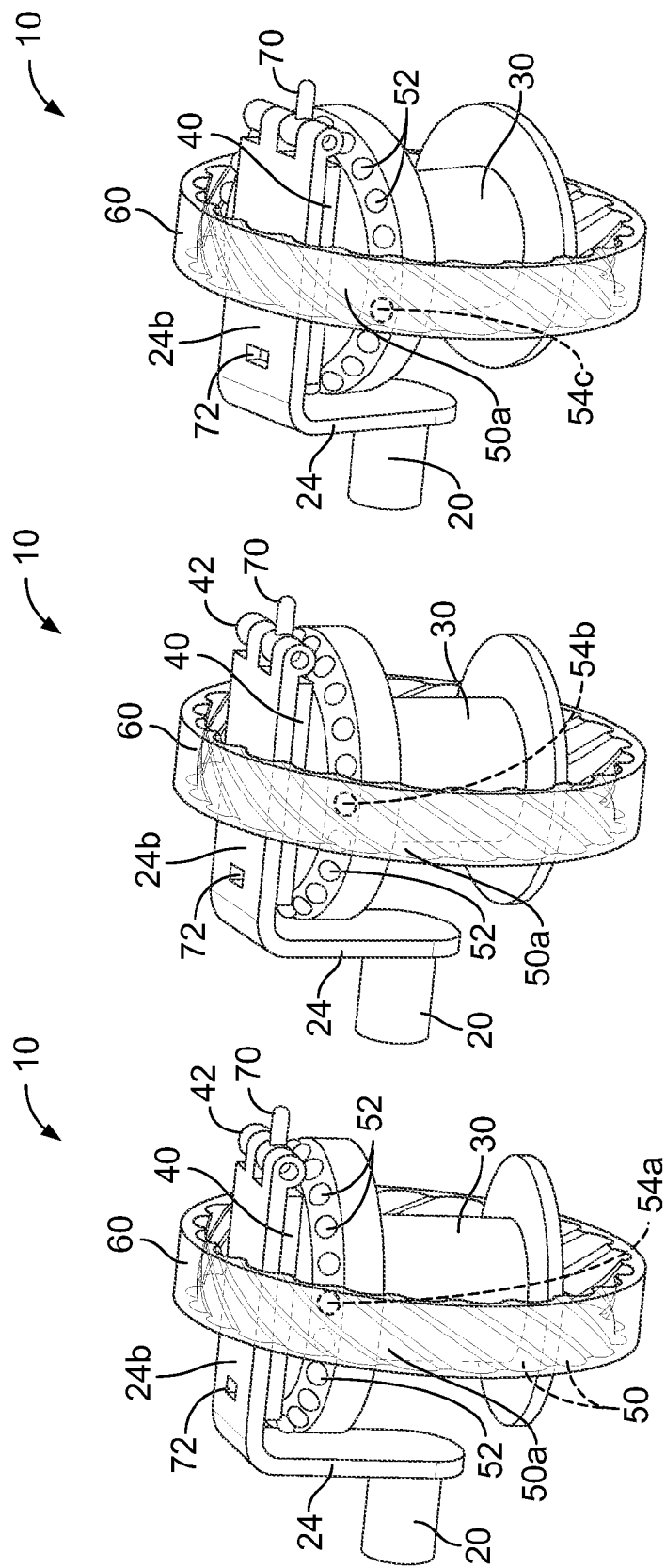

FISHING REEL

FIELD OF THE INVENTION

The present invention relates to the field of fishing reels in general, and in particular, to a fishing reel having a spool that combines features of a spin casting reel and a bait casting reel, with a spool that pivots 90 degrees with respect to a fishing rod when the fishing reel is mounted to the fishing rod to provide a casting mode and a reeling mode.

BACKGROUND OF THE INVENTION

For many years, fishermen have used both spin casting fishing reels and bait casting fishing reels, each having certain advantages and disadvantages. A typical spin casting reel, or spinning reel, includes a spool that is rotationally fixed relative to the spool housing and does not rotate during casting, with the axis of the spool parallel to the axis of the fishing rod. Because the spool is fixed and does not rotate during the cast, the line comes off the spool very easily and the spinning reel is able to cast a lure greater distances than bait casting reels, particularly when using light lures. Thus, a traditional spin casting reel provides virtually unrestricted out-feed of fishing line during casting, which enables for long casting distances. Furthermore, the backlash often associated with bait casting reels is typically avoided when using the fixed spool of the spinning reel because the spool does not rotate, and thereby does not overunwind the line which sometimes happens when casting with a bait casting reel. Thus spin casting reels have the advantage of providing for further casting distances, and do not have the disadvantage of overunspooling which may happen when using bait casting reels.

However, the spin casting reels have a disadvantage because the line comes off the spool during casting in a coiled shape, and when retrieving the line, the bail housing, bail, and line guide of the bail (bail assembly) are driven to rotate about the rotationally fixed spool and serve to wind the line onto the spool. However, the reeling process winds the line back onto the spool and does nothing to remove or alleviate the coiling of the line. Each subsequent cast increases the amount of coiling of the fishing line until the amount of the twist in the line becomes unmanageable.

Thus, with a spin casting reel, while the bail assembly rotates, the rotationally fixed spool is oscillated in and out so that the line guide of the bail lays the line down evenly on the spool during line takeup. The disadvantage of the spinning reel mechanism is that it uses an indirect line takeup, such that the line being wound onto the spool via the rotating bail assembly tends to twist, resulting in curls and coils, and eventually resulting in undesirable snarls and more frequent line replacement. Moreover, with the indirect line takeup used in the spinning reel, the amount of pulling force the angler can apply is reduced, as opposed to a direct line pickup used on a bait casting reel. In addition, an angler may fear tripping or bending the bail if too much pulling force is applied. Nonetheless, the spinning reel is deemed to have several advantages over bait casting reels when it comes to casting distance and lack of overunwinding during casting.

In a typical bait casting fishing reel, on the other hand, a spool is rotatably mounted on a spool hub positioned generally perpendicular to the fishing rod as well as the fishing line when the bait casting reel is mounted on a fishing rod. The spool hub remains in a fixed position with respect to the reel housing and the fishing rod. When reeling in the fishing line, the spool rotates about the spool hub, and a line guide is driven to oscillate back and forth above the spool and spool hub to evenly distribute the line on the spool as the spool is rotated and takes up line. An advantage of a typical bait casting reel is that during line takeup, the angler is able to maximize the test of the line because the line is taken up at an angle perpendicular to the spool and wound directly onto the spool. Another advantage is that less twist or snarl results in the line because it casts the line out without coiling or twisting it, and during the reeling process the line is fed onto the spool during takeup at an angle of 90 degrees, resulting in fewer line snarls due to less twist in the line, and fewer replacements of the line when it becomes twisted.

However, when casting a bait casting fishing reel, given that the line is oriented at 90 degrees from the spool, the spool of the bait casting reel must spin in order to release the line, which restricts the casting distance. Moreover, the momentum of the spinning spool results in an overunwinding of fishing line and creates backlash when casting, resulting in more line than necessary unwinding from the spool. As a result, the line may get tangled and create a knot or birds nest of the fishing line which can cause aggravation to the fisherman and require time to unsnarl. Meanwhile, an undesirable slack in the line may cause an angler to delay his retrieve and possibly result in a lost strike, or lost fish, or result in a lure getting snagged on the bottom. To prevent the overunwinding or backlash of the line during casting, the angler typically monitors the outflow of line and may place a thumb or finger over the line on the spool to apply pressure to the spool in an attempt to avoid backlash. This may serve to further reduce the distance a lure may be casted.

It is apparent that bait casting reels and spin casting reels each have their advantages and disadvantages. It is desirable to create a fishing reel that operates in certain respects like a bait casting reel when retrieving line and in certain respects like a spinning reel when casting line. The inventor of the present invention, has previously invented a fishing reel that combines some of the advantages of a bait casting reel and a spin casting reel into a single fishing reel that is set forth in U.S. Pat. No. 7,896,277, entitled "Fishing Reel," that issued on Mar. 2, 2011 and is herein incorporated by reference in its entirety. In the patent the rod mount rotates 90 degrees to achieve the advantages of both a spin casting reel and a bait casting reel.

SUMMARY OF THE INVENTION

In an embodiment, a fishing reel is provided having a reel housing comprising a ring gear with a rod mount directly or indirectly attached to the ring gear and a spool having an axis with the spool adapted to be positioned within the ring gear, a reel crank adapted to impart rotational movement to the spool, a line guide positioned radially outwardly from the spool, a flange hingedly attached to the spool, wherein the spool may be positioned in a first casting position wherein the axis of the spool is generally parallel to a fishing rod when the rod mount is mounted to the fishing rod; and wherein the spool is movable 90 degrees with respect to the flange to be positioned in a second reeling position, wherein the axis of the spool is generally perpendicular to a fishing line being retrieved upon line retrieval; and wherein as the reel crank is rotated the spool orbitally rotates within the ring gear and the spool also rotates about its axis.

In an embodiment, a fishing reel is provided comprising a reel housing comprising a ring gear, a rod mount directly or indirectly attached to the ring gear, a spool having an axis positioned within the ring gear, a reel crank adapted to impart rotational movement to the spool, a line guide positioned radially outwardly from the spool, wherein the spool may be positioned in a first reeling position wherein the axis of the spool is generally perpendicular to the a fishing line being retrieved, and wherein as the reel crank is rotated, the spool orbitally rotates within the ring gear and in a position generally perpendicular to the fishing line being retrieved through 360 degrees of rotation and the spool also rotates about its axis.

BRIEF DESCRIPTION OF THE DRAWINGS

FIG. 7A is a perspective view of the fishing reel 10 with portions removed and transparent ring gear 60 to see the interior of the fishing reel 10 and showing spool 30 orbitally rotating within the housing during reeling with spool 30 in a bait casting reel position;

FIG. 7B is a perspective view of the fishing reel 10 shown in FIG. 7A with portions removed and transparent ring gear 60 to see the interior of the fishing reel 10 and showing spool 30 further orbitally rotating within the housing during reeling with spool 30 in a bait casting reel position;

FIG. 7C is a perspective view of the fishing reel 10 shown in FIG. 7B with portions removed and transparent ring gear 60 to see the interior of the fishing reel 10 and showing spool 30 further orbitally rotating within the housing during reeling with spool 30 in a bait casting reel position.

DETAILED DESCRIPTION OF PREFERRED EMBODIMENTS

Figure 1:
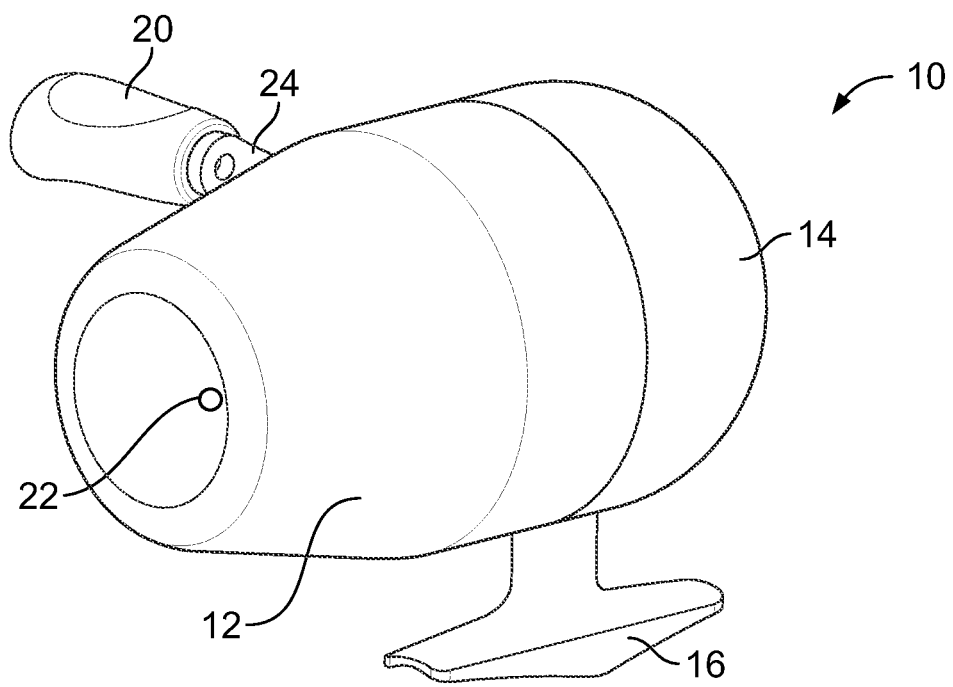
FIG. 1 is a perspective view of an embodiment of a fishing reel 10.

The present embodiments are illustrated as exemplary embodiments that disclose a fishing reel embodying features of the present inventions. FIG. 1 shows a perspective view of a fishing reel 10 having a reel crank 24 shown to the left with a handle paddle 20 positioned thereon. Two paddles are contemplated in the fishing reel shown in the Figures. The paddles are rotatably coupled to the reel crank 24, and although two paddles are shown, a single offset paddle or even a non-rotating paddle could be used. The fishing reel 10 includes spool housing that comprises a back housing 14 and a front cover 12. The spool housing further includes a rod mount 16 that is used to mount the fishing reel to a fishing rod in a conventional manner.

As can be seen in FIG. 1, front cover 22 includes fishing line aperture 22 through which fishing line is drawn from the spool positioned within the reel during casting, and drawn onto the spool during line retrieval. The front cover 12 may be transparent to allow viewing of the interior of the fishing reel 10 and to allow an angler to monitor the condition of the spool and the line. In some embodiments, it may be possible to eliminate the front cover altogether to provide easier access to the spool within. However, where the front cover 12 is eliminated, an eyelet or other guide would be needed for the fishing line to pass through, or be guided by, what is shown as the location of the offset aperture 22 shown in the front cover 12.

Figure 2:
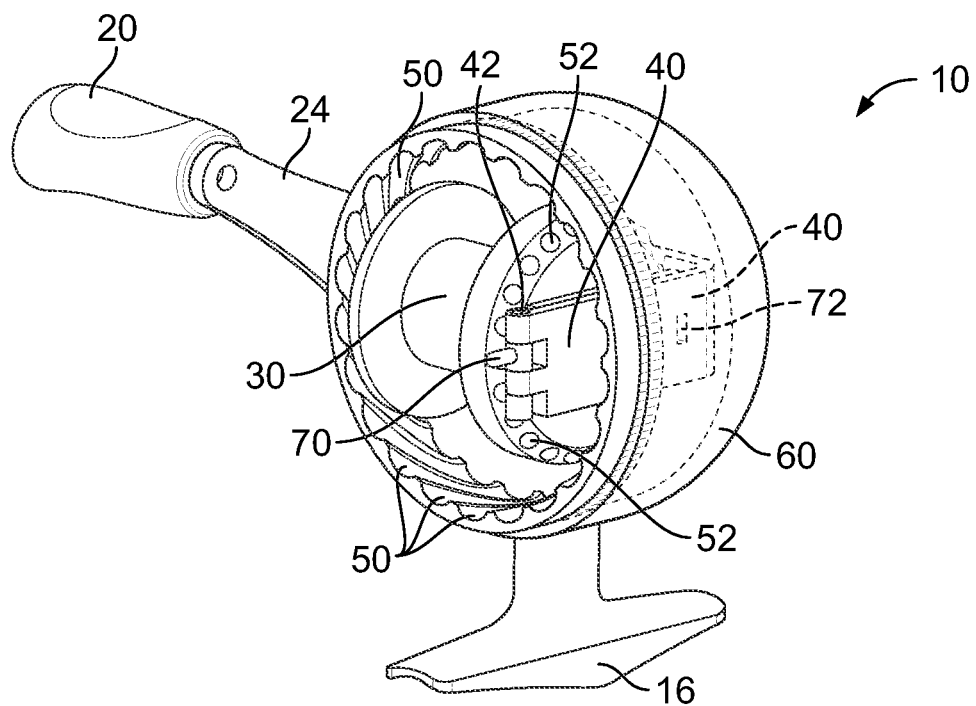
FIG. 2 is a perspective view of the fishing reel 10 shown in FIG. 1 with portions removed to see the interior of the fishing reel 10 and showing spool 30 positioned for reeling in a bait casting reel position.

FIG. 2 shows the same perspective view of fishing reel 10 shown in FIG. 1 with the back housing 14 and front cover 12 removed to show the inner workings of the fishing reel 10. In addition, ring gear 60 positioned between back housing 14 and front cover 12 is shown in a partially transparent fashion to reveal portions of the interior of the fishing reel 10. As shown in FIG. 2, the spool 30 is shown positioned within ring gear 60, wherein spool 30 is in the position of a typical bait casting reel wherein the axis of the spool 30 is perpendicular to rod mount 16 and to a fishing rod when fishing reel 10 is mounted on the fishing rod. Thus, FIG. 2 shows fishing reel 10 in a reeling or retrieval mode, wherein the spool 30 takes advantage of the typical position of a bait casting reel during line takeup. In this manner, during line takeup, the positioning of the spool 30 achieves the advantages of a bait casting reel by provided for direct line takeup onto the spool at an angle of 90 degrees.

The spool 30 includes spool protrusions 52 on an end thereof that are adapted to engage mating, angled grooves 50 that are positioned on an inner surface of ring gear 60. The end of spool 30 having spool protrusions 52 is pivotally attached to revolving flange 40 via spring loaded hinge 42. As noted above, in FIG. 2 the fishing reel 10 is shown in bait casting mode that is used for fishing line retrieval. The revolving flange 40 in this bait casting mode is releasably latched to the spool 30 to maintain the spool in bait casting, or retrieval mode. The drive mechanism between the reel crank and the revolving flange may be a worm drive similar to that used in traditional spin casting reels.

Figure 3:
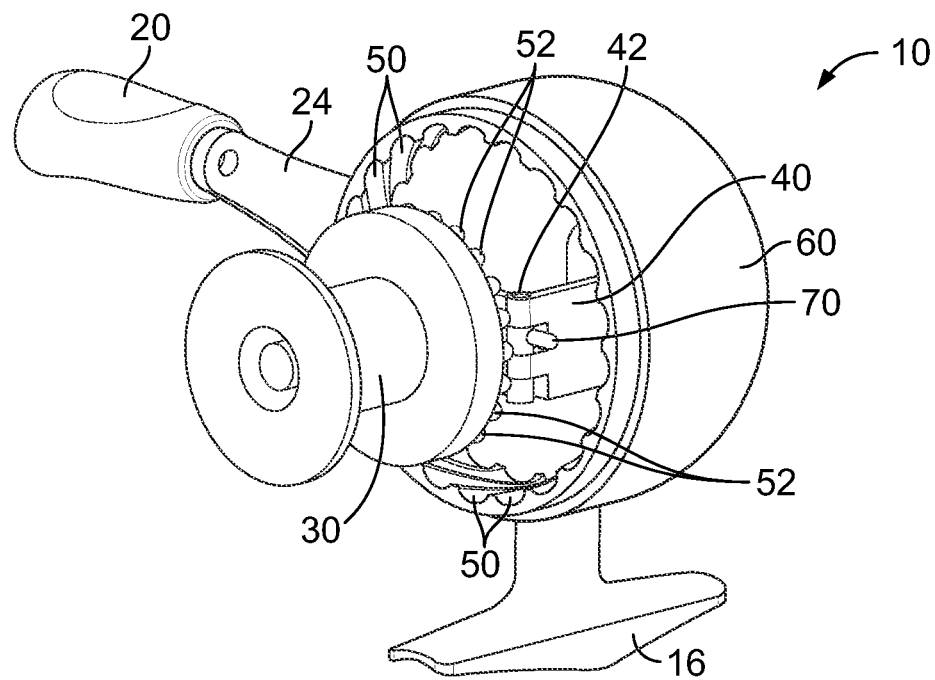
FIG. 3 is a perspective view of the fishing reel 10 shown in FIGS. 1 and 2 with portions removed to see the interior of the fishing reel 10 and showing spool 30 positioned for casting in a spin casting reel position.

FIG. 3 shows fishing reel 10 wherein spool 30 has been rotated 90 degrees from the bait casting, or retrieval mode, and is now positioned in casting mode, similar to the positioning of a spool in a spin casting reel, with the axis of spool 30 parallel to a fishing rod when rod mount 16 is mounted thereto, and parallel to the direction of line outtake during casting. In FIG. 3, spool 30 has pivoted 90 degrees along hinge 42 to position spool 30 into spin casting mode.

Figure 4:
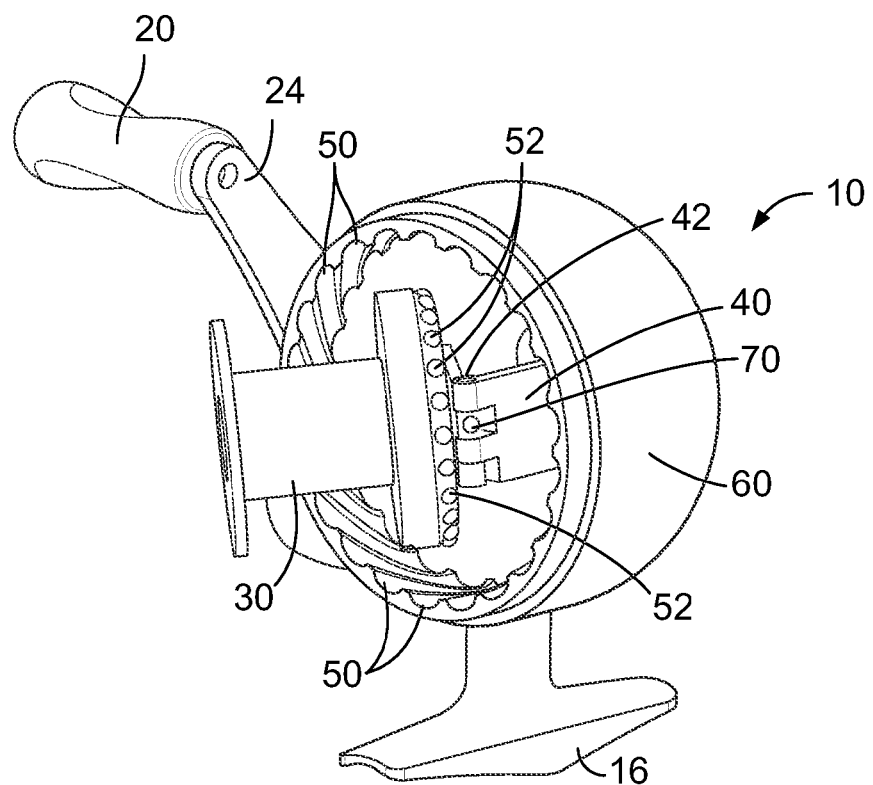
FIG. 4 is a perspective view of the fishing reel 10 shown in FIGS. 1-3 with portions removed to see the interior of the fishing reel 10 and showing spool 30 positioned between a bait casting position and a spin casting position.

FIG. 4 shows fishing reel 10 transitioning from the spin casting mode of FIG. 3 wherein the axis of the spool is parallel to a fishing rod the fishing reel 10 is mounted to, and the bait casting, or retrieval, mode of FIG. 2 where the axis of spool 30 is perpendicular to the fishing rod upon which is mounted wherein the line is taken directly onto the spool 30 at a perpendicular angle. A guide pin 70 is positioned on the hinge 42 of the revolving flange 40 which aligns with a track located in a front cover of the fishing reel. When the reel crank 24 is rotated, the guide pin 70 engages the track located in the front cover of the fishing reel which forces the spool 30 to pivot about the hinge 42 back towards the reeling position.

Fishing reel 10 includes a latch that latches the revolving flange 40 to the spool 30 when the spool is in the reeling mode. A latch release 72 is shown in the revolving flange which may be released by depressing a button mounted on the outside of a back housing of the fishing reel, wherein the when the button is pushed, the spring loaded hinge is released which forces the spool to pivot into the first casting position (shown in FIG. 2).

Figure 5:
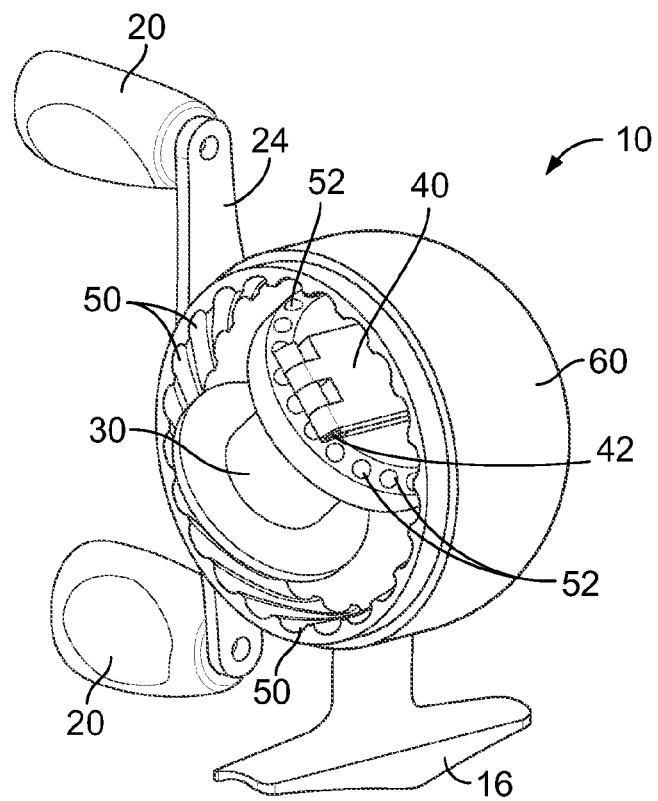
FIG. 5 is a perspective view of the fishing reel 10 shown in FIG. 2 with portions removed to see the interior of the fishing reel 10 and showing spool 30 orbitally rotating within the housing during reeling with spool 30 in a bait casting reel position.

FIG. 5 shows the fishing reel 10 transitioned back to bait casting, or retrieval, mode with the spool 30 perpendicular to the line take up and perpendicular to the fishing rod upon which the fishing reel is mounted. In FIG. 5, the spool 30 provides direct takeup of fishing line and provides the benefits of retrieval typically associated with a bait casting reel. As the reel crank 24 is rotated, the spool protrusions 52 located on an end of the spool 30 ride through mating grooves 50 located on the inner surface of ring gear 60, and serve to rotate the spool about its axis and also orbitally rotate the spool 30 within the ring gear 60.

Figure 6A:
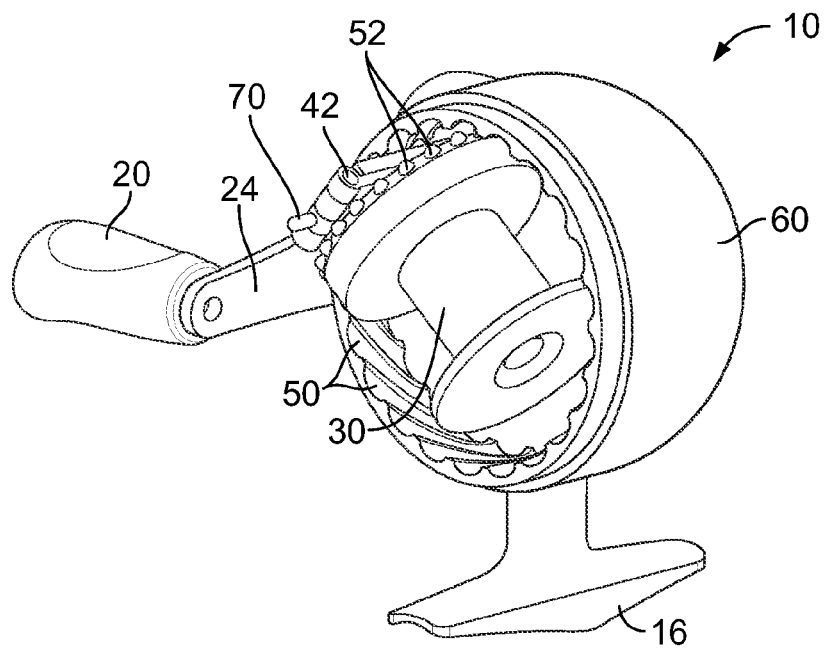
FIG. 6A is a perspective view of the fishing reel 10 shown in FIG. 5 with portions removed to see the interior of the fishing reel 10 and showing spool 30 orbitally rotating within the housing during reeling with spool 30 in a bait casting reel position.

FIG. 6A shows that as reel crank 24 is rotated, the spool protrusions 52 riding through the mating grooves 50 cause the spool 30 to orbitally rotate within ring gear 60. Thus, in FIG. 5, the spool 30 is shown with the end with spool protrusions 52 at roughly a 2 o'clock position, whereas in FIG. 6A, the spool 30 has rotated via reel crank 24 and the effect of spool protrusions 52 riding through mating grooves 50 wherein the end of the spool 30 with spool protrusions 52 is shown at a roughly 10 o'clock position.

Figure 6B:
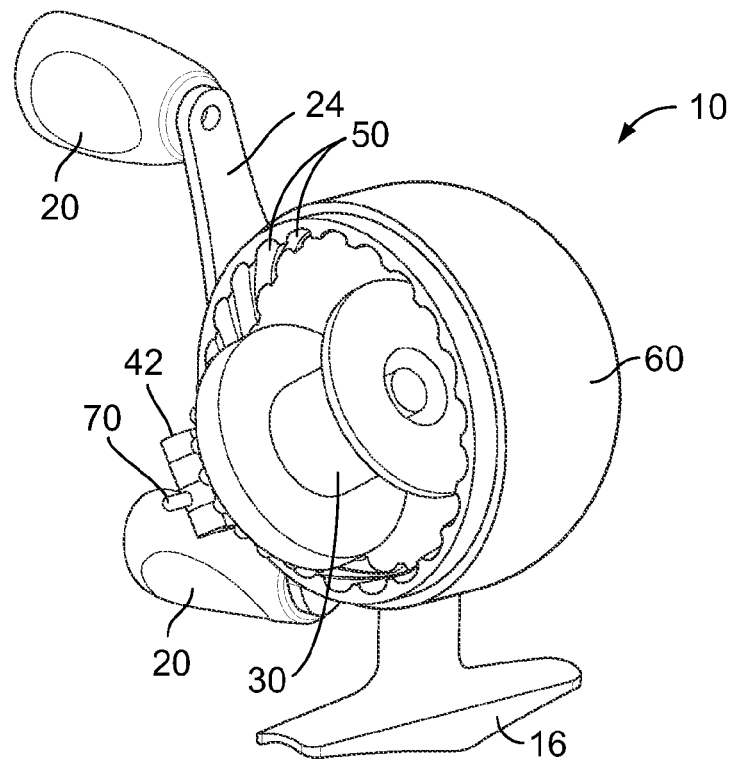
FIG. 6B is a perspective view of the fishing reel 10 shown in FIG. 6A with portions removed to see the interior of the fishing reel 10 and showing spool 30 orbitally rotating within the housing during reeling with spool 30 in a bait casting reel position.

FIG. 6B shows that as reel crank 24 is further rotated, the spool protrusion 52 riding through the mating grooves 50 cause the spool 30 to rotate within ring gear 60. Thus, in FIG. 6A, the spool 30 is shown with the end with spool protrusions 52 at roughly a 10 o'clock position, whereas in FIG. 6B, the spool 30 has rotated via reel crank 24 and the effect of spool protrusions 52 riding through mating grooves 50 wherein the end of the spool 30 with spool protrusions 52 is shown at a roughly 8 o'clock position.

Figure 6C:
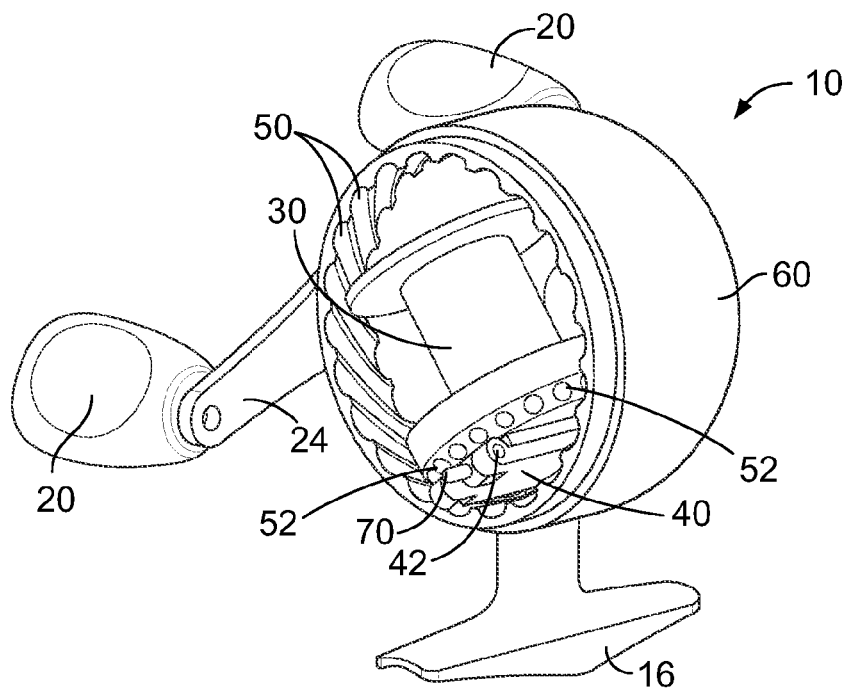
FIG. 6C is a perspective view of the fishing reel 10 shown in FIGS. 6A and 6B with portions removed to see the interior of the fishing reel 10 and showing spool 30 orbitally rotating within the housing during reeling with spool 30 in a bait casting reel position.

FIG. 6C shows that as reel crank 24 is further rotated, the spool protrusion 52 riding through the mating grooves 50 cause the spool 30 to rotate within ring gear 60. Thus, in FIG. 6B, the spool 30 is shown with the end with spool protrusions 52 at roughly a 8 o'clock position, whereas in FIG. 6C, the spool 30 has rotated via reel crank 24 and the effect of spool protrusions 52 riding through mating grooves 50 wherein the end of the spool 30 with spool protrusions 52 is shown at a roughly 8 o'clock position. The rotation of spool 30 within the ring gear 60 is referred to as orbital rotation.

It should be noted that in each of the FIGS. 5, 6A, 6B, and 6C, the spool 30 is positioned perpendicular to the takeup of the fishing line, and thus perpendicular to the fishing rod when the fishing reel 10 is mounted to the fishing rod. In fact, in fishing reel 10, during fishing line retrieval, the spool 30 is positioned perpendicular to the line pickup throughout its orbital rotation within ring gear 60. Thus, during retrieval, the fishing line does not recoil the coils and curls of the fishing line as is the case when retrieving a cast line with a conventional spinning reel. Thus, the fishing reel 10 obtains the casting advantages associated with a spinning reel (as shown in spinning reel, or casting, mode in FIG. 3) and helps to eliminate the disadvantageous line twisting associated with retrieval using a spinning reel. At the same time, the fishing reel 10 obtains the retrieval advantages associated with a bait casting reel, including direct line pickup and fewer problems with line twist and curl.

FIGS. 7A, 7B, and 7C show fishing reel 10 with back housing 14 and front cover 12 removed, as well as gear ring 60 shown as transparent to allow viewing of the inner workings of the reel. FIGS. 7A, 7B, and 7C illustrate how the spool protrusions 52 on spool 30 interact with the mating grooves 50 on the inner surface of ring gear 60 to achieve orbital rotation of spool 30 within fishing reel 12 during line retrieval and to rotate spool 30 about its axis. As spool 30 is rotated during retrieval, the protrusions 52 ride through mating grooves 50 on the inner surface of ring gear 60. In FIG. 7A, a protrusion is shown at position 54a within mating groove 50a. FIG. 7B shows how, as the spool 30 is rotated, the protrusion moves to position 54b within mating groove 50a. Similarly, FIG. 7B shows how, as the spool 30 is further rotated, the protrusion moves to position 54c within mating groove 50c. Thus, the movement of the protrusions 52 through the mating grooves 50 on the inner surface of ring gear 60 causes the spool 30 to rotate within the fishing reel 10 during line retrieval. In a preferred embodiment, two or three protrusions 52 are positioned within a corresponding mating groove at a given time.

Figure 8:
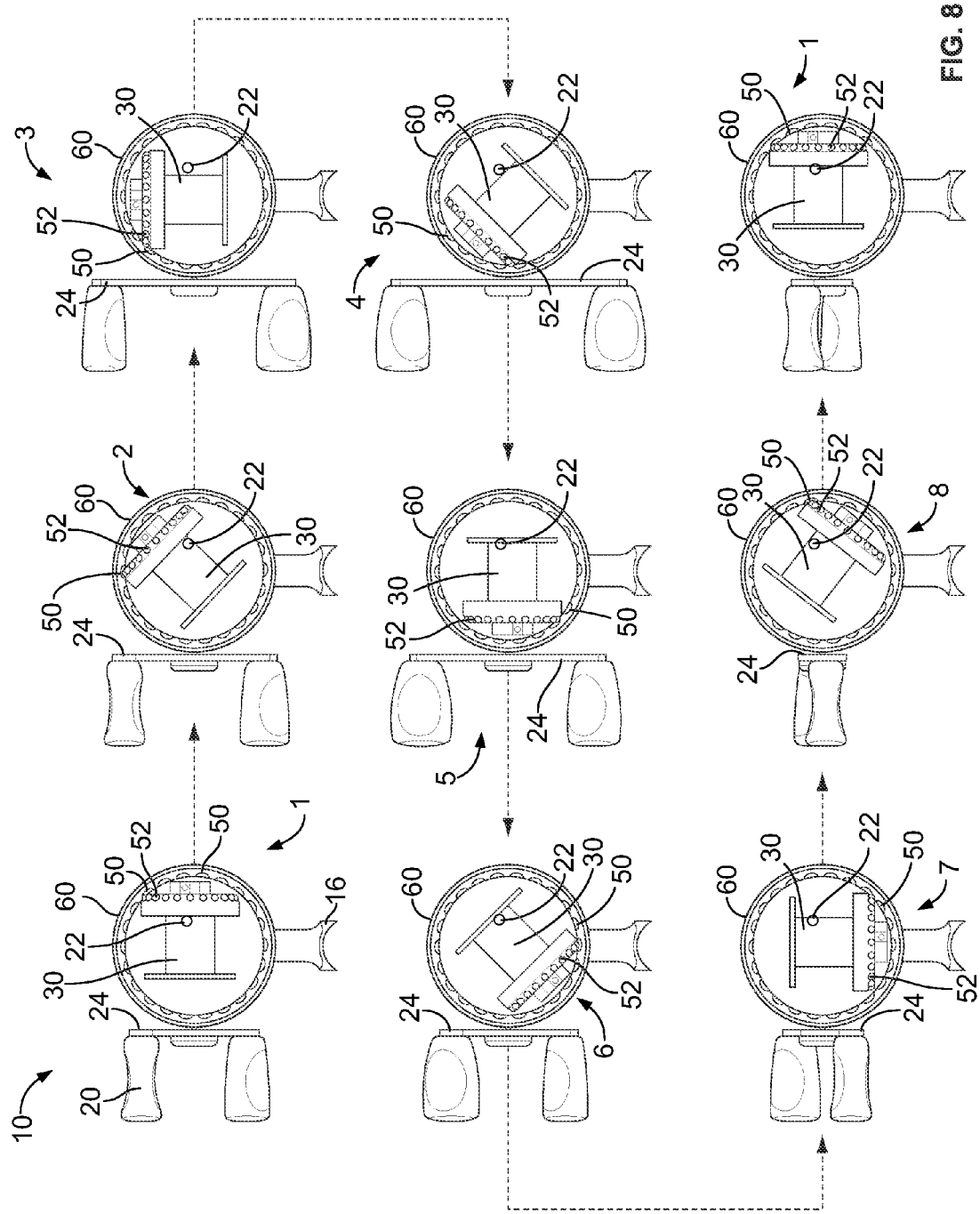
FIG. 8 is a cutaway view of fishing reel, with the spool 10 orbitally rotating within ring gear 60 from position 1 through position 8, back to position 1.

FIG. 8 further illustrates the orbital rotation of spool 30 within fishing reel 10 during line retrieval. Fishing reel 10 starts with spool 30 having an end with protrusions 52 located thereon positioned at 3 o'clock in starting Position 1. At this point fishing line aperture 22 is shown positioned above the spool 30 such that the line is taken up perpendicularly onto the spool 30 during retrieval. As the reel crank 24 is rotated, the end of the spool 30 with protrusions 52 rotates within ring gear 60 and moves to Position 2 at 1:30 o'clock. Again, at Position 2, fishing line aperture 22 is shown positioned above the spool 30 such that the line is taken up perpendicularly onto the spool 30 during retrieval. As the reel crank 24 is further rotated, the end of the spool 30 with protrusions 52 rotates within ring gear 60 and moves to Position 3 at 12 o'clock. Further rotation of reel crank 24 results in the end of the spool 30 with protrusions 52 rotating into Position 4 at 10:30 o'clock.

As the reel crank 24 is further rotated, the end of the spool 30 with protrusions 52 rotates within ring gear 60 and moves to Position 5 at 9 o'clock. As the reel crank 24 is further rotated, the end of the spool 30 with protrusions 52 rotates within ring gear 60 and moves to Position 6 at 7:30 o'clock. Further rotation of reel crank 24 results in the end of the spool 30 with protrusions 52 rotating into Position 7 at 6 o'clock. Further rotation of reel crank 24 results in the end of the spool 30 with protrusions 52 rotating into Position 8 at 4:30 o'clock.

Finally, further rotation of reel crank 24 results in the end of the spool 30 with protrusions 52 rotating back into Position 1 at 3 o'clock. Thus, FIG. 8 shows the orbital rotation of spool 30 within fishing reel 10 from Position 1 through Position 8, and then back to starting Position 1 again showing a full 360 degree rotation of spool 30. In each of Positions 1 through 8, fishing line aperture 22 is shown positioned above the spool 30 such that the line is taken up perpendicularly onto the spool 30 during retrieval. In addition, the sequence of Positions 1-8 shows how the fishing line aperture 22 traverses along the length of spool 30, thereby evenly distributing the line onto the spool 30.

The disclosed fishing reel permits greater casting distance by operating in a spin casting mode during casting, while helping to eliminate the additive coiling and twisting of the line during the reeling process and subsequent casting by operating in a bait casting mode during line retrieval. In particular, the fishing reel achieves these goals by aligning the spool like a spin casting reel during casting, i.e., positioning the axis of the spool to be parallel to the fishing rod; and then reorienting the spool 90 degrees to align the spool like a bat casting reel during line retrieval, i.e., position the axis of the spool to be perpendicular from its casting position during the reeling process, and revolving the spool so that the fishing line is taken up at 90 angle onto the spool during line retrieval. In this manner, for each rotation of the spool, line is fed back onto the spool with the same coiling as it left the spool, without adding further coil or twist to the line during the line retrieval process.

The claims should not be read as limited to the elements specifically described unless stated to that effect. Therefore, all embodiments that come within the scope and spirit of the following claims and equivalents thereto are claimed as the invention.

What is claimed is:

1. A fishing reel comprising:
   a reel housing comprising a ring gear;
   a rod mount attached to the ring gear;
   a spool having an axis, and adapted to be positioned within the ring gear;
   a reel crank adapted to impart rotational movement to the spool;
   a line guide positioned radially outwardly from the spool;
   a flange hingedly attached to the spool;
   wherein the spool may be positioned in a first casting position wherein the axis of the spool is generally parallel to a fishing rod when the rod mount is mounted to the fishing rod; and
   wherein the spool is movable 90 degrees with respect to the flange to be positioned in a second reeling position within the ring gear, wherein the axis of the spool is generally perpendicular to a fishing line being retrieved upon line retrieval; and
   wherein when the reel crank is rotated when the spool is in the second reeling position, the spool orbitally rotates within the ring gear and in a position generally perpendicular to the fishing line being retrieved through 360 degrees of rotation and the spool also rotates about its axis.

2. The fishing reel of claim 1, further wherein the line guide is comprised of an aperture within a front cover attached to the ring gear.

3. The fishing reel of claim 2, wherein the aperture is offset such that as the spool orbitally rotates within the ring gear, the fishing line is taken up along the length of the spool evenly distributing the line onto the spool during line retrieval.

4. The fishing reel of claim 1, wherein a series of spool protrusions are positioned on an end of the spool that are positioned in corresponding mating grooves positioned on an inner surface of the ring gear.

5. The fishing reel of claim 4, wherein three spool protrusions are positioned in a single mating groove as the spool orbitally rotates within the ring gear.

6. The fishing reel of claim 4, wherein orbital motion of the spool within the ring gear when the reel crank is rotated is caused to occur by the spool protrusions riding through the corresponding mating grooves on the inner surface of the ring gear.

7. The fishing reel of claim 4, wherein when the spool protrusions move through the corresponding mating grooves positioned on the inner surface of the ring gear when the reel crank is rotated, the spool is caused to rotate about its axis.

8. The fishing reel of claim 4, wherein when the spool rotates about its axis, it also orbitally rotates within the ring gear.

9. The fishing reel of claim 1, wherein the flange is spring loaded.

10. The fishing reel of claim 9, further including a releasable latch that latches the flange to the spool such that the spool is retained in its second reeling position.

11. The fishing reel of claim 10, wherein a latch release is positioned on the fishing reel such that when the latch is released the spring loaded flange moves the spool into its first casting position.

12. The fishing reel of claim 11, wherein when the reel crank is rotated, the spool is moved back into its second reeling position.

13. The fishing reel of claim 12, wherein a guide pin is positioned on the hinge of the flange which aligns with a track located in a front cover of the fishing reel.

14. The fishing reel of claim 12, wherein when the reel crank is rotated, a guide pin engages a track located in a front cover of the fishing reel which forces the spool to pivot about the hinge back towards the second reeling position.

15. The fishing reel of claim 11, wherein the latch release is a button mounted on an outside of a back housing of the fishing reel, wherein when the button is pushed, the spring loaded hinge on the revolving flange is released which forces the spool to pivot into the first casting position.

16. The fishing reel of claim 1, wherein the rod mount is directly attached to the ring gear.

17. A fishing reel comprising:
    a reel housing comprising a ring gear;
    a rod mount attached to the ring gear;
    a spool having an axis, and the spool adapted to be positioned within the ring gear;
    a reel crank adapted to impart rotational movement to the spool;
    a line guide positioned radially outwardly from the spool;
    wherein the spool may be positioned in a first reeling position within the ring gear wherein the axis of the spool is generally perpendicular to a fishing line being retrieved; and
    wherein when the reel crank is rotated, the spool orbitally rotates within the ring gear and in a position generally perpendicular to the fishing line being retrieved through 360 degrees of rotation and the spool also rotates about its axis.

18. The fishing reel of claim 17, further including a flange hingedly attached to the spool;
    wherein the spool is movable 90 degrees with respect to the flange such that the spool is positionable in a second casting position wherein the axis of the spool is generally parallel to a fishing rod when the rod mount is mounted to the fishing rod.

19. The fishing reel of claim 18, wherein the flange is spring loaded and further includes a releasable latch that may latch the flange to the spool such that the spool is retained in its first reeling position.

20. The fishing reel of claim 19, wherein a guide pin is positioned on the hinge of the flange which aligns with a track located in a front cover of the fishing reel, wherein when the reel crank is rotated, the guide pin engages the track located in the front cover of the fishing reel which forces the spool to pivot about the hinge back towards the first reeling position.

21. The fishing reel of claim 17, wherein a series of spool protrusions are positioned on an end of the spool and are positioned in corresponding mating grooves positioned on an inner surface of the ring gear, wherein orbital motion of the spool within the ring gear is caused to occur by the spool protrusions riding through the corresponding mating grooves on the inner surface of the ring gear, and wherein as the spool protrusions move through the corresponding mating grooves positioned on the inner surface of the ring gear, the spool is also caused to rotate about its axis.

22. The fishing reel of claim 17, wherein the rod mount is directly attached to the ring gear.

* * * * *